Aug. 22, 1950  F. H. KIND  2,519,476
BORING APPARATUS
Filed Feb. 12, 1947  2 Sheets-Sheet 1

INVENTOR.
Frederick H. Kind
BY
Quarles & French
ATTORNEYS

Aug. 22, 1950  F. H. KIND  2,519,476
BORING APPARATUS
Filed Feb. 12, 1947  2 Sheets-Sheet 2

INVENTOR.
Frederich H. Kind
BY
Quarles & French
ATTORNEYS

Patented Aug. 22, 1950

2,519,476

UNITED STATES PATENT OFFICE 2,519,476

BORING APPARATUS

Frederick H. Kind, Racine, Wis., assignor to Racine Tool & Machine Company, Racine, Wis., a corporation of Wisconsin Application February 12, 1947, Serial No. 728,084

6 Claims. (Cl. 77—3)

The invention relates to boring apparatus.

The object of the invention is to provide an eccentrically adjustable boring bar and control means for the same whereby roughing, semi-finishing, and finishing boring operations with a single bar provided with a plurality of cutters may be readily accomplished.

A further object of the invention is to provide a pivotally mounted boring bar mounted on a spindle provided with a sliding actuating sleeve or cam for angularly shifting the cutters of the bar and holding them in an adjusted position, the shifting mechanism for said bar including a member adapted to be moved to predetermined set positions.

The invention further consists in the several features hereinafter described and more particularly defined by claims at the conclusion hereof.

Figure 1:
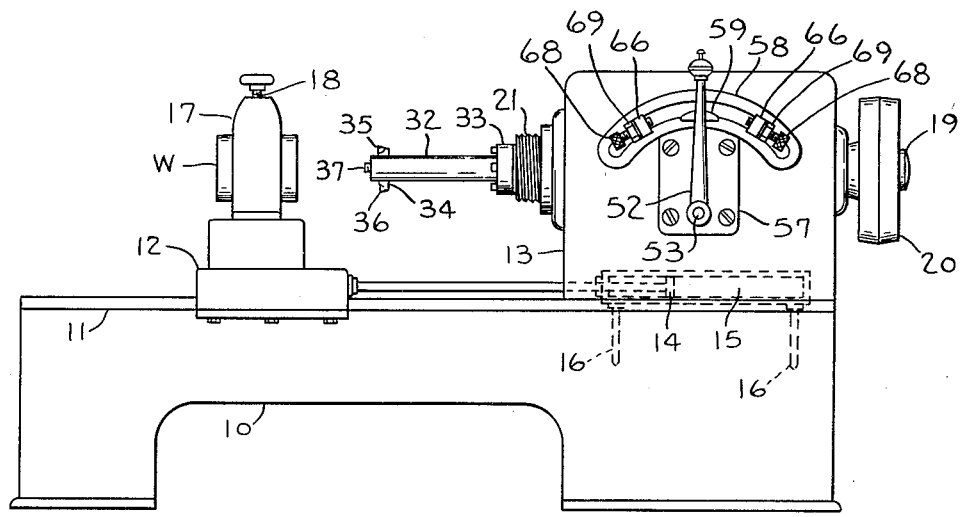
Fig. 1 is an elevation view of a boring apparatus embodying the invention.
Figure 2:
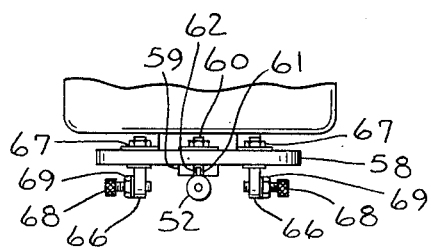
Fig. 2 is a plan view of a part of the apparatus, parts being broken away.
Figure 3:
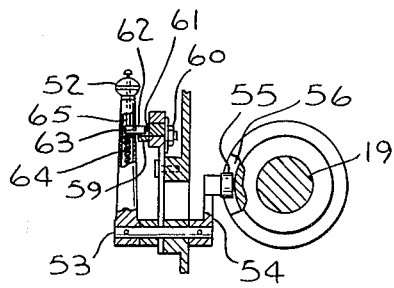
Fig. 3 is a detailed vertical sectional view taken on the line 3—3 of Fig. 1, parts being broken away.
Figure 7:
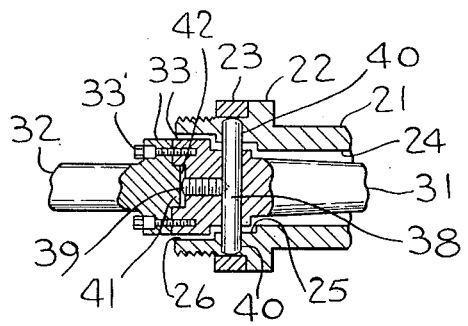
Fig. 7 is a detailed horizontal sectional view taken on the line 7—7 of Fig. 4.
Figure 8:
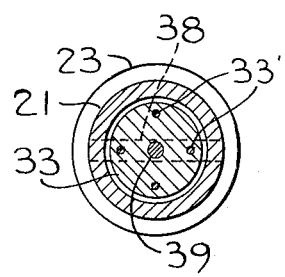
Fig. 8 is a detailed vertical sectional view taken on the line 8—8 of Fig. 4.

Referring to the drawings, the numeral 10 designates the bed of the machine having ways 11 upon which a carriage 12 is mounted to reciprocate relative to a fixed headstock 13. The carriage may be moved along the ways relative to the headstock either by manually controlled means or by power, and in the drawings I have shown a hydraulic power feed for the carriage comprising a ram or piston 14 connected to the carriage and operating in a double acting hydraulic cylinder 15 whose ends are provided with suitable hydraulic fluid connections 16 which are associated with control valves and a source of pressure fluid (not shown) whereby the carriage may be moved inwardly or outwardly relative to the headstock or held in any desired set position. The carriage 12 is shown as provided with a work holder 17 in which the work W, such as a bushing, is mounted and clamped in position by a clamping screw 18 or other suitable chucking device where the work is held stationary and the boring bar revolves. In other instances the carriage may carry the boring tool and the work be chucked to the headstock spindle hereinafter described to revolve therewith. In either instance the boring bar and the work are moved lengthwise relative to each other, and either the bar or the work is rotated to effect the boring operation.

As herein shown, the headstock 13 has a drive spindle 19 suitably journalled therein and rotated in any suitable manner as by a pulley 20 adapted to be connected by belts (not shown) to any suitable source of power, such as an electric motor. The forward end 21 of the spindle is threaded to take a chuck and is also flanged at 22 to provide a shoulder against which a pivot pin retaining ring 23 abuts. This end of the spindle is bored out to provide a series of bores 24, 25, and 26 of progressively increasing diameter, there being a slot 27 in said spindle adjacent the back end of the bore 24 and a hole 28 having a threaded portion 29 oppositely disposed relative to the slot 27 and slightly in advance thereof and provided with a threaded plug 30.

The boring bar is made in two parts, a shank portion 31 and a bar proper portion 32, which parts have abutting flanged ends 33 secured together by a series of bolts 33'. The bar part 32 carries a cutter member 34, here shown as formed with cutting ends 35 and 36, said member being mounted as usual in a transverse slot in the part 32 and clamped in position by a set screw 37. The shank portion 31 is pivotally mounted in the bored out end of the spindle by a pin 38 locked to portion 31 by a set screw 39 and turning in alined bores 40 in the spindle and prevented from lengthwise movement by the ring 23. The bar part 32 has a centering boss 41 fitting a centering recess 42 in the part 31. The inner end of the shank portion 31 is provided with a yoke 43 projecting through the slot 27 and in which a ball bearing 44 is suitably pivotally mounted on a pin 44', said end also having a bore 45 in which one end of a coil spring 46 is mounted, the other end of said spring being seated on the plug 30.

The boring bar is swung about its pivot so as to move the cutters 35 and 36 radially inwardly or outwardly to the desired extent for the boring of a hole in the work by a cam member 47 in the form of a sleeve having a tapered bore 48 against which the ball bearing 44 is urged by the spring 46, the shifting of said sleeve relative to the ball bearing brings different diameters of the bore 48 into operative relation with said ball and thus varies the position of the cutters relative to the work. The member 47 is provided with a bearing liner 49 which is of the same taper as the bore 48 is split lengthwise the width of the slot 27 and is threaded at both ends to receive nuts 50 and 51 whereby said liner may be shifted relative to the member 47 in case it is necessary to take up for wear of said liner which is slidably mounted on the drive spindle 19.

The member 47 is adapted to be shifted manually through the connection of a shift lever 52 with a shaft 53 rotatably mounted in the headstock and carrying a crank 54 provided with a roller 55 mounted in an annular groove 56 in said member. Thus shifting lever 52 shifts the member 47 in the same direction. For holding the lever 52 in a rough bore position a plate 57, mounted on the headstock, is provided with a slotted segment 58 in which a notched block 59 is adjustably clamped by a threaded stud and nut 60, and the notch 61 in said segment is adapted to be engaged by a detent 62 pivotally mounted at 63 in a slot in the lever 52 and normally urged downwardly to a notch engaging position by a spring 64 and adapted to be moved to release position by a manually controlled release rod 65 slidably mounted in said lever 52.

The segment 58 also has stop blocks 66 slidably movable in its slot and adjustably clamped thereto for rough adjustment by threaded studs and nuts 67. For fine adjustment each stop block 66 is provided with a stop screw 68 adjustably mounted therein and locked in position by a lock nut 69. One of the stop blocks limits the outward movement of the cutter 35 for semi-finish boring, and the other limits the outward movement of the cutter 36 for finish boring of the work W.

Figure 4:
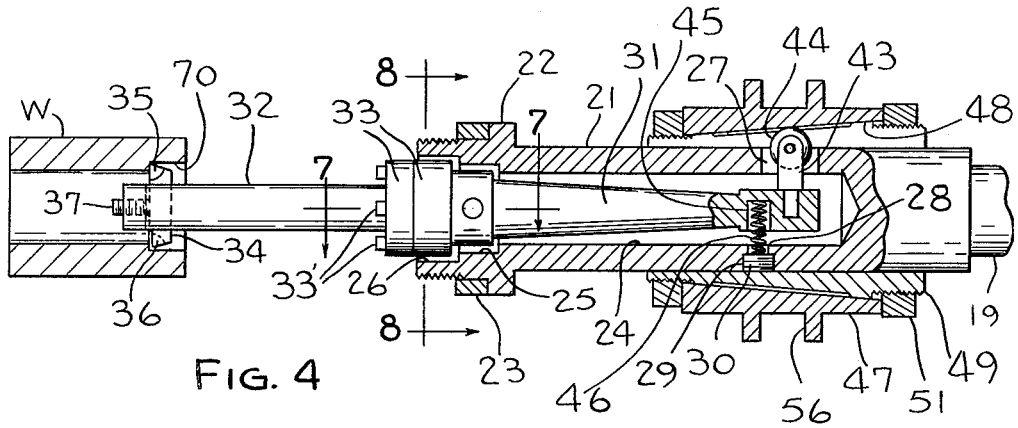
Fig. 4 is a detailed vertical sectional view through the boring bar and the work, showing the bar in rough boring position.
Figure 5:
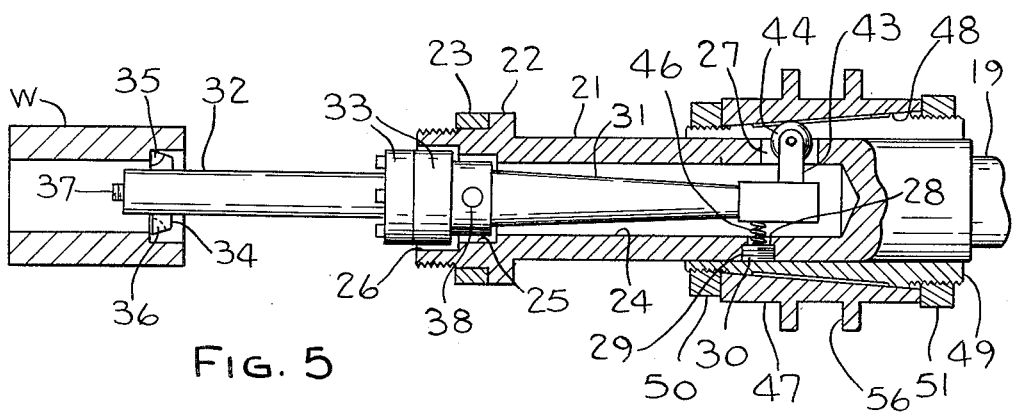
Fig. 5 is a view similar to Fig. 4 showing the bar in position for semi-finish boring.

With the above described construction when the sleeve or cam 47 is held in the position shown in Fig. 4 in which the detent 62 is engaged in the notch 61, the cutter 35 is in a rough boring position, and as the spindle 19 with the boring bar is revolved and the carriage 12 is moved toward the headstock 13, a rough bore 70 will be formed in the work W. Now if a semi-finish is desired, the detent 62 is released and the lever 52 swung toward and right moving the sleeve 47 toward the right as viewed in the drawings until the lever engages the right hand stop screw 68. The cutter 35 has then been moved a predetermined distance radially outwardly from its rough bore position, and the semi-finishing boring operation is then effected, the parts being in the position shown in Fig. 5.

Figure 6:
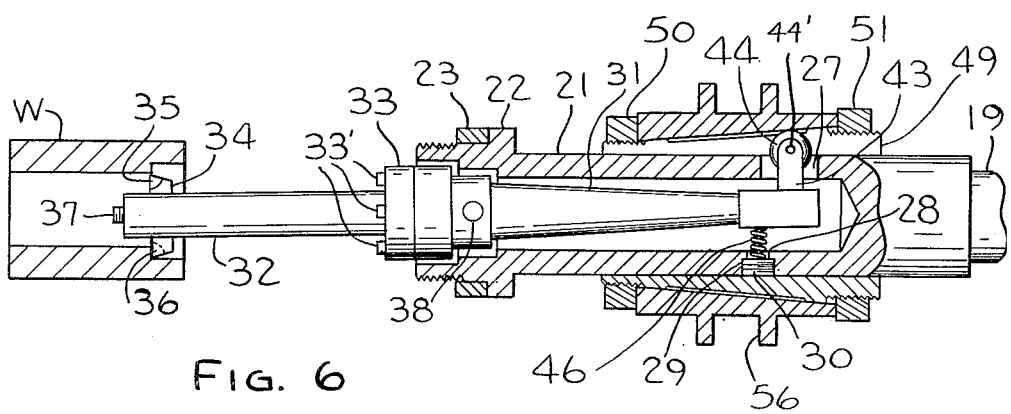
Fig. 6 is a view similar to Fig. 4 showing the bar in position for finish boring.

For finishing boring the cutter 36 is moved into boring relation to the work by shifting the lever 52 toward the left to engage the left hand stop screw 68 under which conditions the sleeve 47 has been moved toward the left and the parts are in the position shown in Fig. 6.

In many instances, the semi-finish boring operation is not required but a rough boring and finish boring are enough to complete the boring operation on the work.

As previously noted, instead of revolving the cutter bar by its mounting on the headstock spindle, the work may be chucked or otherwise secured to said spindle and the boring bar with the adjustable cam sleeve 47 suitably mounted on the carriage similar to the tools in the turret head of a turret lathe to effect the boring operation.

I desire it to be understood that this invention is not to be limited to any particular form or arrangement of parts except in so far as such limitations are included in the claims.

What I claim as my invention is:

1. In a boring apparatus in which the work and a boring member are given a reciprocatory and rotary movement relative to each other, the combination with said boring member provided with relatively fixed roughing and finishing cutters projecting from diametrically opposite sides of said member, of a support for pivotally mounting said member for eccentric positioning relative to the work, means for angularly shifting said member about its pivot in diametrically opposite directions comprising a shiftable sleeve cam member operatively engageable with a part of said boring member, and means for longitudinally shifting said cam member in opposite directions to shift said boring member with its cutters in diametrically opposite directions to bring the different cutters successively into operative relation with the wall of the work being bored.

2. In a boring apparatus in which the work and a boring member are given a reciprocatory and rotary movement relative to each other, the combination with said boring member provided with relatively fixed roughing and finishing cutters projecting from diametrically opposite sides of said member, of a support for pivotally mounting said member for eccentric positioning relative to the work, means for angularly shifting said member about its pivot in diametrically opposite directions comprising a cam member longitudinally slidably mounted on said support and operatively engageable with a part of said boring member, and manually operated means for moving said cam member in opposite directions to shift said boring member with its cutters in diametrically opposite directions to bring the different cutters successively into operative relation with the wall of the work being bored and vary the depth of cut of said cutters.

3. In a boring apparatus in which the work and a boring bar are given a reciprocatory and rotary movement relative to each other, the combination with said boring member provided with relatively fixed roughing and finishing cutters projecting from diametrically opposite sides of said member, of a support for pivotally mounting said member for eccentric positioning relative to the work, means for angularly shifting said member about its pivot in diametrically opposite directions comprising a sleeve member longitudinally slidably mounted on said support and having a tapered surface operatively engageable with a part of said member, and means for moving said sleeve member in opposite directions to shift said boring member with its cutters in diametrically opposite directions to bring the different cutters successively into operative relation with the wall of the work being bored and vary the depth of cut of said cutters.

4. In a boring apparatus in which the work and a boring member are given a reciprocatory and rotary movement relative to each other, the combination with said boring member provided with relatively fixed roughing and finishing cutters projecting from diametrically opposite sides of said member, of a support for pivotally mounting said member for eccentric positioning relative to the work, means for angularly shifting said member about it pivot in diametrically opposite directions comprising a shiftable sleeve cam member operatively engageable with a part of said boring member, and manually operable means for longitudinally shifting said cam member in opposite directions to shift said boring member with its cutters in diametrically opposite directions to bring different cutters successively into operative relation with the wall of the work being bored and vary the depth of cut of said cutters, and settable means for controlling the extent of shifting of said cam member to limit the maximum depth of cut of said cutters.

5. In a boring apparatus in which the work and a boring member are given a reciprocatory and rotary movement relative to each other, the combination with said boring member provided with relatively fixed roughing and finishing cutters projecting from diametrically opposite sides of said member, of a support for pivotally mounting said member for eccentric positioning relative to the work, means for angularly shifting said member about its pivot in diametrically opposite directions comprising a shiftable sleeve cam member operatively engageable with a part of said boring member, a shift lever operatively engageable with said cam member for longitudinally moving the same in opposite directions to shift said boring member with its cutter in diametrically opposite directions to bring the different cutters successively in operative relation with the wall of the work being bored and vary the depth of cut of the cutters, means for locking said lever in one of the boring positions of said boring member in which said boring member is centrally disposed relative to the work, and means for limiting the movement of said lever in another of the boring positions of said bar to limit the depth of cut.

6. A boring apparatus as claimed in claim 3 in which the sleeve member has a lengthwise adjustable bearing slidably mounted on the support with a tapered collar mounted between the ends of said bearing.

FREDERICK H. KIND.

REFERENCES CITED

The following references are of record in the file of this patent:

UNITED STATES PATENTS

| Number | Name | Date |
|---|---|---|
| 293,397 | Baker | Feb. 12, 1884 |
| 2,058,360 | Schmidt | Oct. 20, 1936 |
| 2,314,084 | Fried | Mar. 16, 1943 |